US008701089B2

(12) United States Patent
Izumi et al.

(10) Patent No.: US 8,701,089 B2
(45) Date of Patent: Apr. 15, 2014

(54) PROGRAM EXECUTION DEVICE AND METHOD FOR CONTROLLING THE SAME

(75) Inventors: Shinji Izumi, Osaka (JP); Kohsaku Shibata, Osaka (JP); Kouichi Katou, Osaka (JP)

(73) Assignee: Panasonic Corporation, Osaka (JP)

( * ) Notice: Subject to any disclaimer, the term of this patent is extended or adjusted under 35 U.S.C. 154(b) by 433 days.

(21) Appl. No.: 12/877,515

(22) Filed: Sep. 8, 2010

(65) Prior Publication Data

US 2010/0332905 A1  Dec. 30, 2010

Related U.S. Application Data

(63) Continuation of application No. PCT/JP2009/000970, filed on Mar. 4, 2009.

(30) Foreign Application Priority Data

Mar. 14, 2008 (JP) ................................. 2008-066593

(51) Int. Cl.
*G06F 9/44* (2006.01)
(52) U.S. Cl.
USPC ........................................................ 717/124
(58) Field of Classification Search
USPC ........................................................ 717/124
See application file for complete search history.

(56) References Cited

U.S. PATENT DOCUMENTS

| 6,353,923 | B1 * | 3/2002 | Bogle et al. ................... 717/128 |
| 6,718,294 | B1 * | 4/2004 | Bortfeld ......................... 703/20 |
| 6,931,631 | B2 | 8/2005 | Bates et al. |
| 7,124,404 | B1 * | 10/2006 | Bebout et al. .................. 717/127 |
| 7,210,145 | B2 * | 4/2007 | Srinivasan ..................... 718/100 |
| 8,321,838 | B2 * | 11/2012 | Alpern .......................... 717/124 |
| 2003/0237023 | A1 * | 12/2003 | Satoh et al. ...................... 714/28 |
| 2005/0050159 | A1 * | 3/2005 | Suraski ......................... 709/217 |
| 2006/0112394 | A1 | 5/2006 | Asai et al. |
| 2006/0225043 | A1 * | 10/2006 | Oda et al. ...................... 717/124 |
| 2006/0229861 | A1 * | 10/2006 | Tatsuoka et al. ................ 703/21 |
| 2006/0294369 | A1 * | 12/2006 | Matsushima et al. ......... 713/164 |
| 2007/0294671 | A1 * | 12/2007 | Demetriou et al. ........... 717/124 |
| 2007/0294696 | A1 * | 12/2007 | Papakipos et al. ............ 718/102 |
| 2009/0235233 | A1 | 9/2009 | Suzuki et al. |
| 2011/0307233 | A1 * | 12/2011 | Tseng et al. .................... 703/14 |

FOREIGN PATENT DOCUMENTS

CN           1783016 A     6/2006
(Continued)

OTHER PUBLICATIONS

Miller et al. "A Mechanism for Efficient Debugging of Parallel Programs" 1988 ACM 0-89791-269-1/88/0006/0135, p. 135-144.*
Santa Cruz Summary of ACM/ONR Workshop on Parallel and Distribute Debugging, May 21-22, 1991, p. 18-31.*

(Continued)

*Primary Examiner* — Anna Deng
(74) *Attorney, Agent, or Firm* — McDermott Will & Emery LLP

(57) ABSTRACT

Conventionally, when executing a plurality of programs while being synchronized by a plurality of debuggers, an interface has been required for performing a particular coordination between the debuggers. In the present invention, programs are synchronously executed without coordination between the debuggers by performing a control method including a step for maintaining a program execution state in the debuggers to be different from an actual program execution state, so that the program execution is retained, if necessary, in response to a program execution request from a debugger.

5 Claims, 14 Drawing Sheets

(56) References Cited

FOREIGN PATENT DOCUMENTS

| | | |
|---|---|---|
| JP | 5-88933 | 4/1993 |
| JP | 8-171498 | 7/1996 |
| JP | 9-259002 | 10/1997 |
| JP | 2006-79142 | 3/2006 |
| JP | 2006-164001 | 6/2006 |
| JP | 2008-27041 | 2/2008 |
| WO | WO-2006/137223 A1 | 12/2006 |

OTHER PUBLICATIONS

MMiller et al. Summary of ACM/ONR Worksho on Parallel and Distribute Debugging May 17-19, 1993, p. 8-23.*

Miller et al. Summary of ACM/ONR Worksho on Parallel and Distribute Debugging May 17-18, 1993, p. 8-23.*

Chinese Office Action issued in Chinese Patent Application No. 200980108676.X mailed on Mar. 12, 2013.

* cited by examiner

PROGRAM EXECUTION DEVICE AND METHOD FOR CONTROLLING THE SAME

CROSS REFERENCE TO RELATED APPLICATION

This is a continuation application of PCT application No. PCT/JP2009/000970, filed on Mar. 4, 2009, designating the United States of America.

BACKGROUND OF THE INVENTION (1) Field of the Invention

The present invention relates to program execution devices and methods for controlling the same, and in particular, to a program execution device which controls the program execution device using multiple debuggers without contradictions and a method for controlling the same.

(2) Description of the Related Art

In recent years, there are program execution devices which include a simulator that is capable of simultaneously executing multiple programs running on a single processor or multiple processors, or an evaluation board on which multiple processors are mounted. Such program execution devices are useful for program development and for debugging.

In particular, it is possible to easily find problems by connecting multiple debuggers to the program execution device for simultaneously debugging multiple programs. Here, in principle, the programs executed by the program execution device and the debuggers which debug the programs are in a one-to-one correspondence.

Upon receipt of an execution request from a debugger, the program execution device, which is capable of executing multiple programs in parallel and is connected to multiple debuggers, start executing a program corresponding to the debugger which has made the execution request.

Here, since the program execution device is capable of executing the multiple programs in parallel, it is necessary to synchronize the execution of the multiple programs each of which is debugged by a corresponding debugger.

There is a proposed multicomputer debugger system which provides synchronous execution of multiple programs by including a communication interface for debuggers and synchronizing timing of execution requests from the debuggers (for example, see Japanese Unexamined Patent Application Publication No. 8-171498, hereinafter referred to as Patent Reference 1).

FIG. 14 is a block diagram showing a configuration of the multicomputer debugger system.

The multicomputer debugger system shown in FIG. 14 includes: a program execution device 61 capable of executing multiple programs in parallel; a debugger 11 and a debugger 12 that are connected to the program execution device 61; and a multicomputer debugger 73 that is a communication interface for the debuggers.

The program execution device 61 includes a program execution unit 62 which executes a program to be debugged by the debugger 11, and a program execution unit 63 which executes a program to be debugged by the debugger 12.

The multicomputer debugger system disclosed in Patent Reference 1 uses the multicomputer debugger 73 that is the communication interface for the debuggers so as to synchronize program execution requests made by the debugger 11 and the debugger 12.

Next, examples of typical operations in the multicomputer debugger system, which are "stop" and "break" are described.

(Stop Operation)

First, in the case where the program execution device 61 is executing multiple programs in parallel, one of the debugger 11 and the debugger 12 connected to the program execution device 61, for example, the debugger 11 makes a stop request.

In this case, the program execution device 61 stops executing only the program corresponding to the debugger 11. To be more specific, the program execution device 61 stops the program execution unit 62, and continues execution of other programs, that is, the program corresponding to the debugger 12 in this example. Alternatively, the program execution device 61 stops the program execution unit 62, stops execution of all the programs (here, stops execution of the program corresponding to the debugger 12), and causes all the debuggers (the debugger 11 and the debugger 12) to be in a stopped state.

(Break Operation)

In the case where the program execution device 61 executes multiple programs in parallel and detects a breakpoint, the program execution device 61 stops executing only the program corresponding to the program in which the breakpoint has been detected, in a similar manner as the stop operation. Here, the program execution device 61 continues execution of the other program in which no breakpoint has been detected. Alternatively, the program execution device 61 stops execution of all the programs, and causes all the debuggers (the debugger 11 and the debugger 12) to be in a stopped state.

SUMMARY OF THE INVENTION

However, the conventional technique has problems as described below.

The communication interface for the debuggers (multicomputer debugger 73) is provided to the program execution device 61 so that synchronous execution of multiple programs can be performed. However, providing the communication interface to the program execution device 61 requires man-hour including specification planning, mounting, and maintaining of the communication interface. Furthermore, as the types of the debuggers compatible with the communication interface increases, man-hour also increases.

In addition, the program execution device 61 is capable of executing multiple programs in parallel. However, for example, in the case where a stop request from one debugger 11 stops only one program corresponding to the debugger 11 out of multiple programs being executed, and where other programs are continued to be executed, memory or one or more variable values are rewritten. This results in debugging problems. Further, in the case where one debugger, for example, a stop request from one debugger 11 stops all the programs being executed, the debugger 12 which has not made a stop request is also stopped. Therefore, a debug access to the debugger 12 occurs, which is not originally necessary. This impedes necessary debugging from being promptly performed.

Furthermore, the stopping caused by the breakpoint has problems similar to those of the stopping caused by the stop request. More specifically, when only the program in which a breakpoint was detected is stopped, debugging problems occur due to the continued execution of other programs. Further, when execution of all the programs is stopped due to the detection of the breakpoint, unnecessary debug access occurs because all the debuggers are stopped.

As to the termination processing, a communication interface is required for determining if execution of all the programs has been terminated. This requires man-hour such as mounting and maintaining of the communication interface.

As to the debugger connection, when a debugger is connected while a program is being executed, reset processing is performed by the debugger, and memory or one ore more variable values are rewritten. This results in debugging problems.

The present invention is conceived to solve such problems, and has an object to provide a program execution device which is capable of perform synchronous execution without providing a communication interface for debuggers and which suppresses debug access, and a method for controlling the same.

Means to Solve the Problems

In order to solve the conventional problems, the control method according to an aspect of the present invention is a method for controlling a program execution device which includes a plurality of debuggers and a program execution unit, the program execution unit executing, in parallel, a plurality of programs to be debugged by the debuggers. The method includes: receiving a start request to start program execution or a stop request to stop program execution from each of the debuggers, and holding a flag indicating the start request or the stop request for each of the debuggers; and causing the program execution unit to start or stop executing the programs, based on a combination of the start request and the stop request indicated by the flags. In the causing, when the program execution unit is caused to stop executing the programs, the stopping of the execution of the programs is notified to a debugger included in the debuggers and corresponding to the flag indicating the stop request.

With the configuration, it is possible to perform synchronous execution of programs or synchronous stopping of programs based on a combination of requests indicated by flags, without providing a communication interface for debuggers and without interactions between the debuggers. Further, in the case of synchronous stopping of the programs, the stopping can be notified only to the debugger which made the stop request for stopping program execution. Thus, it is possible to suppress unnecessary debug access from debuggers.

Here, it may be that in the causing, when the combination includes only the start request, the program execution unit starts executing all of the programs.

With the configuration, even if the program execution device receives execution requests individually from debuggers, the program execution device does not perform program execution till receiving the execution requests from all the debuggers. This allows the program execution device to synchronize program execution. As a result, it is possible to perform synchronous execution of programs corresponding to respective debuggers without interactions between the debuggers.

Further, it may be that in the causing, when the combination includes the stop request, the program execution unit stops executing all of the programs, and notifies the stopping of the execution of the programs only to the debugger corresponding to the stop request.

With the configuration, the stopping is notified only to the debugger which has made the stop request; and thus, the debuggers which have not made the stop request does not stop. Thus, it is possible to prevent unnecessary debug access from the debuggers which have not made the stop request.

Further, it may be that in the holding, when a breakpoint is detected in any one of the programs being executed by the program execution unit, a flag indicating the stop request from a debugger is held assuming that the stop request to stop the execution of the any one of the programs has been received, the debugger being included in the debuggers and corresponding to the any one of the programs in which the breakpoint has been detected.

With the configuration, the program execution device notifies the stopping only to the debugger which corresponds to the program in which the breakpoint has been detected; and thus, other debuggers do not stop. As a result, it is possible to prevent unnecessary debug access from the debuggers which are independent of the program in which the breakpoint has been detected.

Further, the control method according to an aspect of the present invention is a method for controlling a program execution device which includes a plurality of debuggers and a program execution unit, the program execution unit executing, in parallel, a plurality of programs to be debugged by the debuggers. The method includes: receiving, from each of the debuggers, a disconnection request to disconnect a connection between the debugger and the program execution device, and holding, for each of the debuggers, a flag indicating whether or not the disconnection request has been made; and causing the program execution unit to terminate, based on a combination of the disconnection request indicated by the flags. Here, the causing includes determining, from the flag, whether or not all of the debuggers connected to the program execution device have been made the disconnection request; and causing the program execution device to terminate when it is determined in the determining that all of the debuggers connected to the program execution device have been made the disconnection request.

With the configuration, it is possible to terminate the program execution device based on the determining of the disconnection, without providing the communication interface for the debuggers.

Further, the control method according to an aspect of the present invention is a method for controlling a program execution device which includes a plurality of debuggers and a program execution unit, the program execution unit executing, in parallel, a plurality of programs to be debugged by the debuggers. The method includes: holding an execution flag indicating whether or not the program execution unit has executed at least one of the programs; receiving a reset request from a debugger that is included in the debuggers connected to the program execution device; determining whether the received reset request is valid or not; holding a reset flag indicating whether or not the reset request is valid according to a result of the determination in the determining; and resetting the program execution device based on the reset flag and the execution flag.

With the configuration, it is possible to control reset processing based on the method for controlling a program execution device and to debug with no influence on the program being executed, without providing the communication interface for the debuggers.

Here, it may be that when it is determined in the determining that the reset request is invalid, the debugger included in the debuggers and corresponding to the reset request is notified that the reset request was invalid.

With the configuration, by notifying that the reset processing was invalid, a developer can recognize that the reset processing was invalid.

Here, it may be that in the determining, when the reset request has been received from the debugger that is included in the debuggers connected to the program execution device, the reset request is determined to be valid regardless of a value of the execution flag.

With the configuration, the developer can forcibly perform reset processing at desired timing.

Here, it may be that the method further includes resetting a debug resource of the program execution device based on the reset flag and the execution flag, in which, in the resetting of a debug resource, when the reset flag indicates that the reset request is invalid and the execution flag indicates that the program execution unit has executed the at least one of the programs, the debug resource of the program execution device is reset.

With the configuration, it is possible to prevent the debug resource from being processed incorrectly by initializing only the debug resource at the time of debugger connection.

Further, the program execution device according to an aspect of the present invention is a program execution device which includes: a program execution unit configured to execute, in parallel, a plurality of programs to be debugged by a plurality of debuggers; a holding unit configured to receive a start request to start program execution or a stop request to stop program execution from each of the debuggers, and to hold a flag indicating the start request or the stop request for each of the debuggers; and a program execution control unit configured to cause the program execution unit to start or stop executing the programs, based on a combination of the start request and the stop request indicated by the flags, in which when the program execution unit is caused to stop executing the programs, the program execution control unit is configured to notify a debugger of the stopping of the execution of the programs, the debugger being included in the debuggers and corresponding to the flag indicating the stop request.

It is to be noted that the present invention can be implemented not only as a device, but also as an integrated circuit which includes processing units included in the device, a method including the processing units included in the device as steps, a program causing a computer to execute those steps, and information, data and signals indicating the program.

According to an aspect of the present invention, it is possible to achieve a program execution device which is capable of performing synchronous execution without providing a communication interface for debuggers and which suppresses debug access, and a method for controlling the same.

Further, with the program execution device and the method for controlling the same according to an aspect of the present invention, it is possible not only to achieve synchronous execution without providing the communication interface for the debuggers, but also to cause only necessary debuggers to be in a stopped state at the time of synchronous stopping or break of the programs. This allows prompt debugging without causing unnecessary debug access.

Further Information about Technical Background to this Application

The disclosure of Japanese Patent Application No. 2008-066593 filed on Mar. 14, 2008 including specification, drawings and claims is incorporated herein by reference in its entirety.

The disclosure of PCT application No. PCT/JP2009/000970 filed on Mar. 4, 2009, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Hereinafter, detailed descriptions of preferred embodiments will be described with reference to the drawings.

(Embodiment 1)

Figure 1:
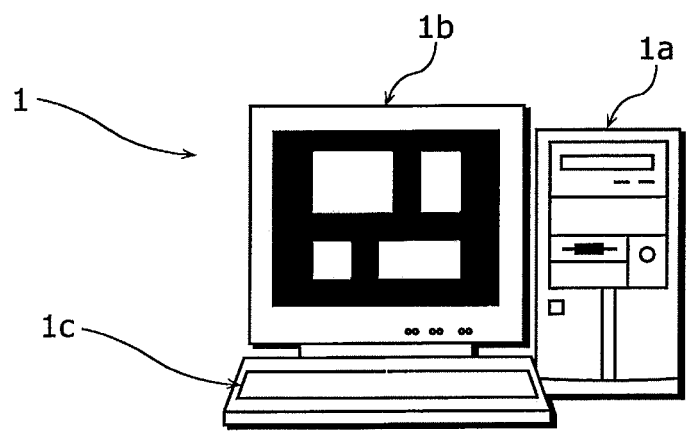
FIG. 1 is an appearance diagram of a program execution device according to embodiments of the present invention.

FIG. 1 is an appearance diagram of a program execution device according to embodiments of the present invention. A program execution device 1 includes a main device 1a, a display device 1b, and an input device 1c. The program execution device 1 simulates a single processor or multiple processors. Further, the program execution device 1 is a data processing device, and executes an application referred to as a simulator. The simulator is capable of simultaneously executing multiple programs running on a processor to be simulated. Here, the simulator generally refers to hardware or software which performs simulated experiments by creating a virtual model when actual experiments are difficult.

The following describes, as one embodiment of the present invention, the program execution device 1 as a simulator 10; however, the program execution device 1 as an evaluation board on which processors are mounted can also achieve the same embodiments and advantageous effects according to the present invention.

Figure 2:
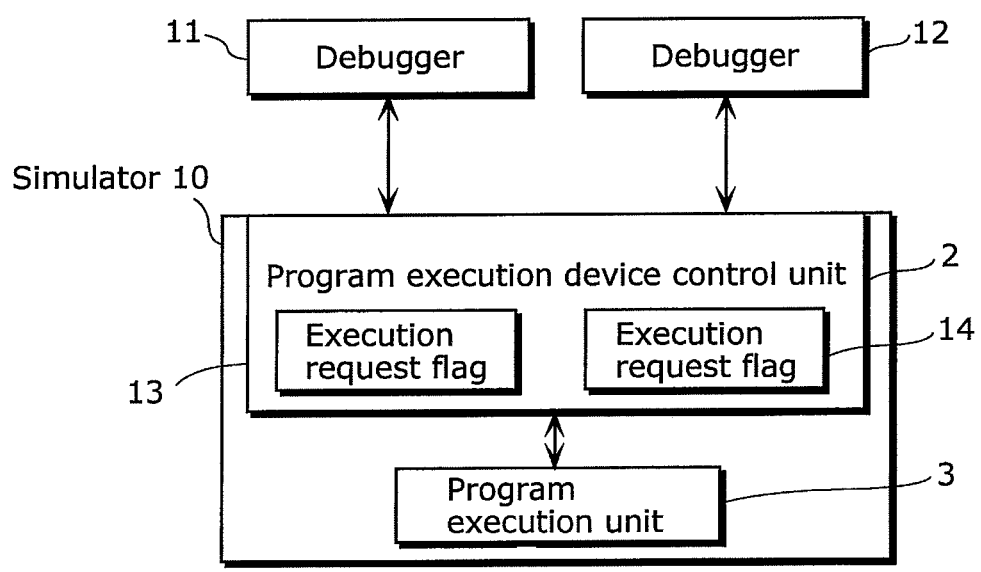
FIG. 2 is a block diagram showing a configuration of a simulator and debuggers connected to the simulator according to Embodiment 1.

FIG. 2 is a block diagram showing a configuration of a simulator 10 and debuggers connected to the simulator 10 according to Embodiment 1.

The simulator 10 includes a program execution device control unit 2 and a program execution unit 3, and is connected to the debugger 11 and the debugger 12.

The program execution device control unit 2 includes an execution request flag 13 which holds an execution request from the debugger 11 and an execution request flag 14 which holds an execution request from the debugger 12.

For simplicity of explanation, in embodiments of the present invention, the configuration is described where two debuggers are connected; however, any numbers of debuggers may be connected as long as at least two debuggers are connected. In such a case, the program execution device control unit 2 includes as many execution request flags as the number of debuggers connected to the simulator 10, and each execution request flag holds an execution request from the corresponding debugger. Accordingly, if two or more debuggers are connected to the simulator 10, the similar advantageous effects can be obtained by the method similar to the disclosure of the present invention.

The execution request flag 13 holds an execution request from the debugger 11. Here, the execution request flag 13 has an initial value set to 0. Upon receipt of the execution request from the debugger 11, the value of the execution request flag 13 is set to 1. This causes the execution request flag 13 to hold the execution request from the debugger 11.

Further, the set value of the execution request flag 13 is changed by the program execution device control unit 2. Description of the execution request flag 14 is not repeated since it is similar to that of the execution request flag 13.

The program execution device control unit 2 causes the program execution unit 3 to start or stop execution, based on a combination of a start request and a stop request indicated by the execution request flag 13 and the execution request flag 14.

To be more specific, upon receipt of the execution request of the program or the stop request to stop the program from the debugger 11 or the debugger 12 connected to the simulator 10, the program execution device control unit 2 determines whether or not it is necessary to resume or stop program execution. Further, the program execution device control unit 2 determines whether or not it is necessary to stop the program by detecting a breakpoint in the program being executed.

Further, the program execution device control unit 2 instructs the program execution unit 3 to resume program execution or stop program execution according to the determination result of whether or not it is necessary to resume the program execution or stop the program execution.

Further, the program execution device control unit 2 notifies the stopping only to the debugger which corresponds to the program which has instructed the program execution unit 3 to stop the program execution.

Here, the program execution device control unit 2 determines the resuming or stopping of the program execution, using the execution request flag 13 and the execution request flag 14.

More specifically, the program execution device control unit 2 refers to the values set to the execution request flag 13 and the execution request flag 14, so as to determine the resuming of the program execution or the stopping of the program execution. For example, when the program execution device control unit 2 confirms that both of the execution request flag 13 and the execution request flag 14 have the values set to 1, the program execution device control unit 2 determines that execution of the programs of the program execution unit 3 can be started, and resumes program execution if the program execution unit 3 is not executing the programs.

Here, for example, when the program execution by the program execution unit 3 is being stopped, and when the program execution device control unit 2 confirms that the execution request flag 13 has the value set to 1 and the execution request flag 14 has the value set to 0, the program execution device control unit 2 does not cause the program execution unit 3 to start program execution till the execution request flag 14 has a value set to 1. To be more specific, the program execution device control unit 2 stops program execution performed by the program execution unit 3 till the value of the execution request flag 14 is set to 1.

Further, for example, when program execution is being performed by the program execution unit 3, and when the program execution device control unit 2 confirms that either the execution request flag 13 or the execution request flag 14 has the value set to 0, the program execution device control unit 2 determines that execution of the programs in the program execution unit 3 cannot be continued, and stops all program execution if the program execution unit 3 are executing the programs.

The program execution unit 3 is capable of executing or stopping, in parallel, programs corresponding to respective debuggers (the debugger 11 and the debugger 12).

Further, the program execution unit 3 executes or stops programs based on an instruction from the program execution device control unit 2.

Next, examples of typical operations in the simulator 10, which are, "resuming" "stop" and "break" are described in accordance with the operations of an operator of the debuggers.

Here, the operator of the debuggers connects multiple debuggers (the debugger 11 and the debugger 12) to the simulator 10, and simultaneously debugs multiple programs using the simulator 10.

First, the debugger operator connects the debugger 11 and the debugger 12 to the simulator 10.

Next, the debugger operator loads programs corresponding to respective debuggers (the debugger 11 and the debugger 12) onto the program execution unit 3.

When the debugger operator starts execution of multiple programs performed by the debuggers 11 and 12 in the simulator 10, the program execution device control unit 2 receives a program execution request from the debugger 11 or the debugger 12. In that case, upon receipt of the program execution request, the program execution device control unit 2 performs the execution resuming determination step S1.

Further, when the debugger operator stops execution of a single program or multiple programs to debug multiple programs in the simulator 10, the program execution device control unit 2 performs to the program execution stop step S2.

Further, when the debugger operator sets a breakpoint for debugging multiple programs and when the program execution unit 3 detects the breakpoint while the program is being executed, the program execution device control unit 2 performs the break step S3.

Next, the following describes the program execution resuming determination step S1, the program execution stop step S2 and the break step S3 which are performed by the program execution device control unit 2.

(Program Execution Resuming Determination Step)

First, the program execution resuming determination step S1 is described. The program execution resuming determination step S1 is a distinctive method for determining resuming of program execution in Embodiment 1 of the present invention.

Figure 3:
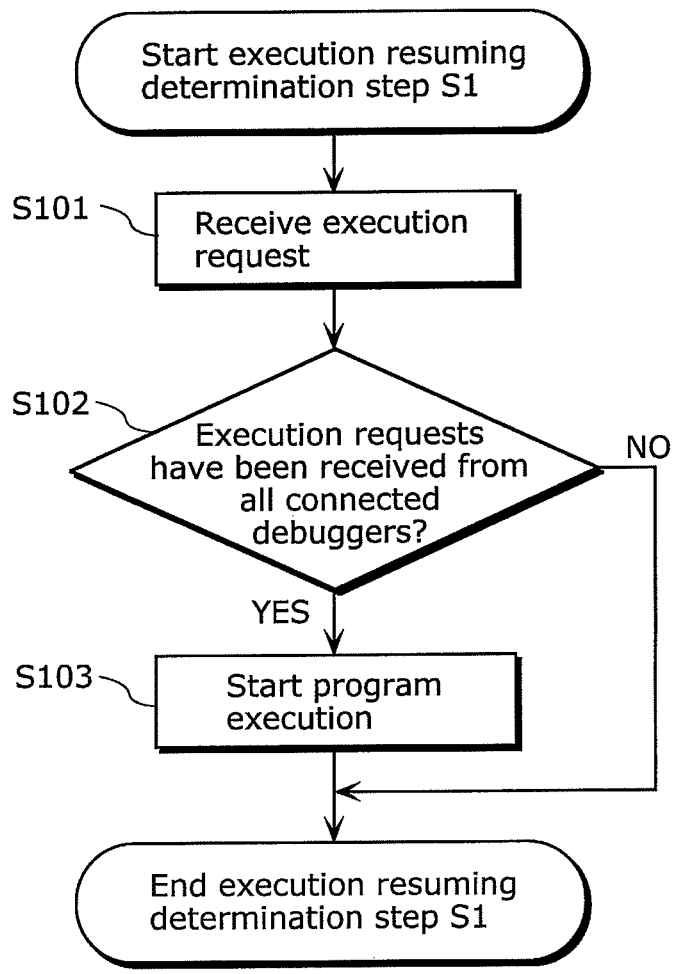
FIG. 3 is a flowchart showing processing of a program execution resuming determination step S1 according to Embodiment 1.

FIG. 3 is a flowchart showing processing of the program execution resuming determination step S1 according to Embodiment 1.

Upon receipt of the program execution request from the debugger 11 or the debugger 12, the program execution device control unit 2 in the simulator 10 starts the program execution resuming determination step S1.

First, the program execution device control unit 2 stores the receipt of the execution request from the debugger 11 or the debugger 12 connected to the simulator 10 (S101: execution request receiving step).

Here, the program execution device control unit 2 uses the execution request flag 13 or the execution request flag 14 so as to indicate which of the debugger 11 or the debugger 12 has made the execution request. For example, the program execution device control unit 2 sets the value of the execution request flag 13 to 1 upon receipt of the execution request from the debugger 11, and sets the value of the execution request flag 14 to 1 upon receipt of the execution request from the debugger 12. It is assumed that the initial values of the execution request flag 13 and the execution request flag 14 are set at 0.

Next, the program execution device control unit 2 determines whether or not the program execution device control unit 2 has received the execution requests from all the debuggers (the debugger and the debugger 12) (S102: execution request receipt determination step).

To be more specific, the program execution device control unit 2 confirms whether or not both of the execution request flag 13 and the execution request flag 14 have the values set to 1.

When the program execution device control unit 2 determines in S102 that the execution requests have been received from all the debuggers (the debugger 11 and the debugger 12), the program execution device control unit 2 instructs the program execution unit 3 to start program execution (S103: program execution resuming step).

More specifically, when the program execution device control unit 2 confirms that both of the execution request flag 13 and the execution request flag 14 have the values set to 1, the program execution device control unit 2 instructs the program execution unit 3 to start program execution.

Then, the program execution resuming determination step S1 ends.

When the program execution device control unit 2 determines in S102 that the execution requests have not received from all the debuggers (the debugger 11 and the debugger 12), the program execution device control unit 2 ends the program execution resuming determination step S1 without instructing anything to the program execution unit 3.

In such a manner, the program execution device control unit 2 performs the program execution resuming determination step S1.

Although it is not particularly mentioned in the above, when the debugger (the debugger 11 or the debugger 12) makes an execution request to the program execution device 1, the program execution device 1 makes a response indicating the receipt of the execution request regardless of whether or not the program will be actually executed; and thus, the debugger (the debugger 11 or the debugger 12) is in a program executing state.

(Program Stop Step)

Next, the program execution stop step S2 is described. The program execution stop step S2 is a distinctive method for stopping program execution in Embodiment 1 of the present invention.

Figure 4:
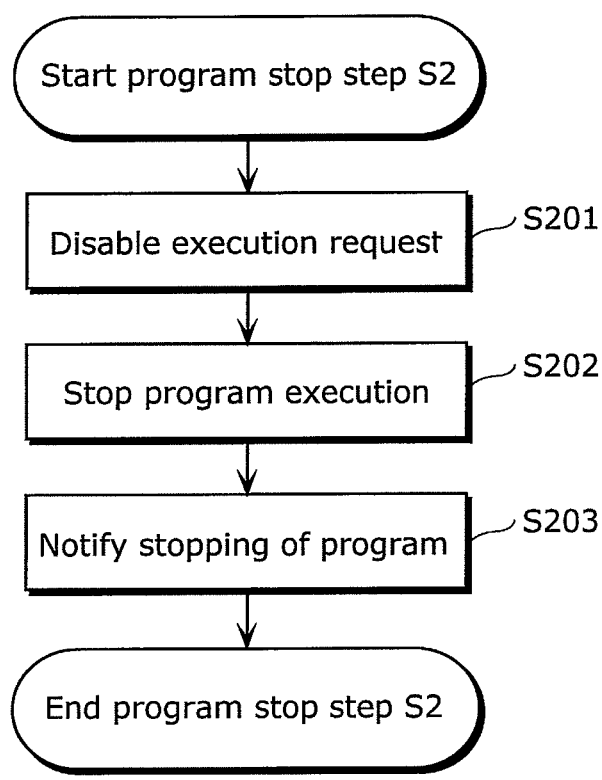
FIG. 4 is a flowchart showing processing of a program stop step S2 according to Embodiment 1.

FIG. 4 is a flowchart showing processing of the program execution stop step S2 according to Embodiment 1.

Upon receipt of a program execution stop request from the debugger 11 or the debugger 12, the program execution device control unit 2 in the simulator 10 starts the program execution stop step S2.

First, the program execution device control unit 2 identifies which of the debugger 11 or the debugger 12 connected to the simulator 10 has made the program execution stop request.

Here, the program execution device control unit 2 identifies which of the debugger 11 or the debugger 12 has made the execution stop request, using the execution request flag 13 or the execution request flag 14. For example, upon receipt of the execution stop request from the debugger 11, the program execution device control unit 2 sets the value of the execution request flag 13 to 0, and upon receipt of the execution stop request from the debugger 12, the program execution device control unit 2 sets the value of the execution request flag 14 to 0. It is assumed that the initial values of the execution request flag 13 and the execution request flag 14 are set to 0. As described with FIG. 3, when the program execution unit 3 is executing the programs corresponding to the debugger 11 and the debugger 12, the execution request flag 13 and the execution request flag 14 have the values set to 1.

Next, the program execution device control unit 2 disables the execution requests from the debuggers connected to the simulator 10 (S201: execution request disabling step).

More particularly, the program execution device control unit 2 identifies, using the execution request flag 13 and the execution request flag 14, which of the debugger 11 or the debugger 12 has made the stop request, and disables the execution request from the debugger which has made the stop request. To be more specific, upon receipt of the stop request from the debugger 11, the program execution device control unit 2 sets the value of the execution request flag 13 corresponding to the debugger 11 to 0, confirms that the execution request flag 13 has the value set to 0, and disables the execution request from the debugger 11 which has made the stop request. After that, even if the debugger 11 whose execution request has been disabled makes an execution request to the program execution device control unit 2, it is not reflected to the execution request flag 13.

Next, the program execution device control unit 2 instructs the program execution unit 3 to stop all the program execution (S202: program execution stop step). Upon receipt of the instruction for stopping execution of all the programs from the program execution device control unit 2, the program execution unit 3 stops all the programs being executed.

Next, the program execution device control unit 2 notifies only to the debugger which has made the stop request that the program execution has been stopped (S203: program stop notification step).

Then, the program execution device control unit 2 ends the program execution stop step S2.

In such a manner, the program execution device control unit 2 performs the program execution stop step S2.

Since the program execution device control unit 2 notifies, in step S203, only to the debugger which has made the stop request that the program execution has been stopped, the debuggers which has not made the stop request keeps their executing state. Thus, the debuggers which have not made the stop request do not perform unnecessary memory reference.

Accordingly, the program execution device 1 can reduce communications between the debugger (the debugger 11 or the debugger 12) and the program execution device 1 so that the request from the debugger which has made the stop request (the debugger 11 or the debugger 12) can be promptly processed.

Furthermore, after the debugger operator performs a stop operation, the request from the debugger 11 or the debugger 12 is promptly processed by the program execution device 1. This leads to improvement of work efficiency of the debugger operator.

(Break Step)

Next, the break step S3 is described. The break step S3 is a distinctive method for stopping program execution in Embodiment 1 of the present invention.

Figure 5:
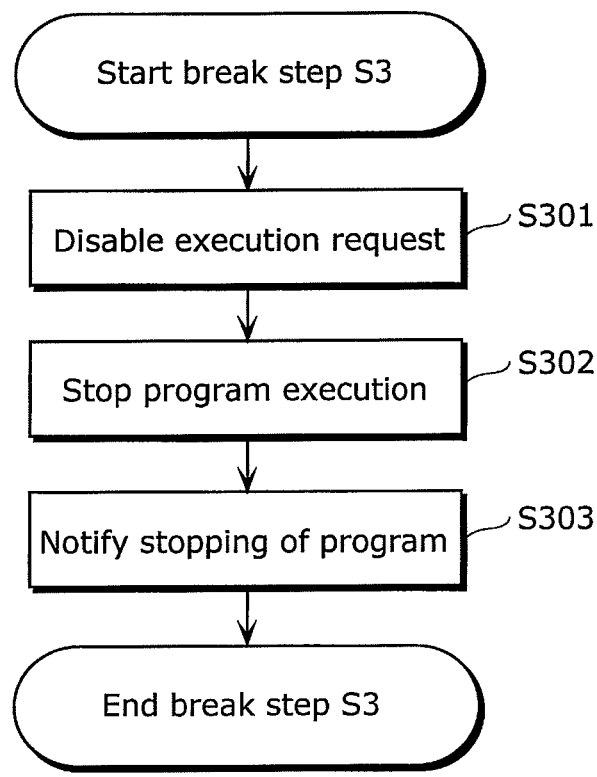
FIG. 5 is a flowchart showing processing of a break step S3 according to Embodiment 1.

FIG. 5 is a flowchart showing processing of the break step S3 according to Embodiment 1.

The program execution device control unit 2 in the simulator 10 starts the break step S3 upon detection of a breakpoint while the program is being executed.

First, the program execution device control unit 2 identifies which of the debugger 11 or the debugger 12, connected to the simulator, corresponds to the program in which the breakpoint has been detected.

Here, the program execution device control unit 2 identifies which of the debugger 11 or the debugger 12 corresponds to the program in which the breakpoint has been detected, using the execution request flag 13 or the execution request flag 14. For example, the program execution device control unit 2 sets the value of the execution request flag 13 to 0 when the debugger 11 corresponds to the program in which the breakpoint has been detected, and sets the value of the execution request flag 14 to 0 when the debugger 12 corresponds to the program in which the breakpoint has been detected.

Next, the program execution device control unit 2 disables the execution request from the debugger corresponding to the program in which the breakpoint has been detected in the similar manner to FIG. 4 (S301: execution request disabling step)

For example, the program execution device control unit 2 sets the value of the execution request flag 13 corresponding to the debugger 11 to 0 when the debugger 11 corresponds to the program in which the breakpoint has been detected. Then, the program execution device control unit 2 confirms that the execution request flag 13 has the value set to 0, and then disables the execution request from the debugger 11.

Further, for example, the program execution device control unit 2 sets the value of the execution request flag 14 corresponding to the debugger 12 to 0 when the debugger 12 corresponds to the program in which the breakpoint has been detected. Then, the program execution device control unit 2 confirms that the execution request flag 14 has the value set to 0, and then disables the execution request from the debugger 12.

Next, the program execution device control unit 2 instructs the program execution unit 3 to stop all the program execution (S302: program execution stop step). Upon receipt of the instruction for stopping all the program execution from the program execution device control unit 2, the program execution unit 3 stops all the programs being executed.

Next, the program execution device control unit 2 notifies only to the debugger corresponding to the program in which the breakpoint has been detected that the program execution has been stopped (S303: stop notification step).

Then, the program execution device control unit 2 ends the break step S3.

In such a manner, the program execution device control unit 2 performs the break step S3.

The program execution device control unit 2 notifies only to the debugger corresponding to the program in which the breakpoint has been detected that the program execution has been stopped; and thus, the debuggers other than the debugger corresponding to the program in which the breakpoint has been detected keeps their executing state. Therefore, the debuggers which are not stopped by the break do not cause unnecessary memory reference or the like. Accordingly, the program execution device 1 can reduce communications between the debugger (the debugger 11 or the debugger 12) and the program execution device 1. This allows prompt processing of the request from the debugger (the debugger 11 or the debugger 12) which corresponds to the program in which the breakpoint has been detected.

Furthermore, if the request from the debugger 11 or the debugger 12 is processed promptly by the program execution device 1 (the simulator 10) after the program execution device 1 was stopped by the break, the debugger operator can improve work efficiency.

As described, the program execution device and the method for controlling the same according to Embodiment 1 allow synchronous execution of multiple programs without interactions between the debuggers, and prevent unnecessary debug access from occurring in stopping program execution.

Further, according to the program execution device and the method for controlling the same in Embodiment 1, it is possible to control the program execution device regardless of consistency between debugger state and program executing state.

Further, according to the program execution device and the method for controlling the same in Embodiment 1, even when the program execution device receives execution requests from debuggers individually, program execution is not performed till execution requests are received from all the debuggers. This allows the program execution device to synchronize program execution. As a result, it is possible to perform synchronous execution of programs corresponding to respective debuggers without interactions between the debuggers.

Further, according to the program execution device and the method for controlling the same in Embodiment 1, the stopping is notified only to the debugger which has made the stop request; and thus, the debuggers which have not made the stop request do not stop. As a result, it is possible to prevent unnecessary debug access from the debuggers which have not made the stop request.

Further, according to the program execution device and the method for controlling the same in Embodiment 1, the program execution device notifies the stopping only to the debugger which corresponds to the program in which the breakpoint has been detected; and thus, other debuggers do not stop. As a result, it is possible to prevent unnecessary debug access from the debuggers which are independent of the program in which the breakpoint has been detected.

Accordingly, it is possible to achieve a program execution device which is capable of performing synchronous execution without providing a communication interface for debuggers and which suppresses debug access, and a method for controlling the same.

Further, with the program execution device and the method for controlling the same according to Embodiment 1, it is possible not only to achieve synchronous execution without the communication interface for the debuggers, but also to cause only necessary debuggers to be in a stopped state when performing synchronous stopping or break of the programs. This allows prompt debugging without causing unnecessary debug access.

(Embodiment 2)

In Embodiment 1, an implementation for controlling the program execution device based on the combination of the requests indicated by the flags, without providing the communication interface for debuggers and without interactions between the debuggers; however, the present invention is not limited to this. In Embodiment 2, an implementation for controlling the program execution device different from that described in Embodiment 1 is described.

Figure 6:
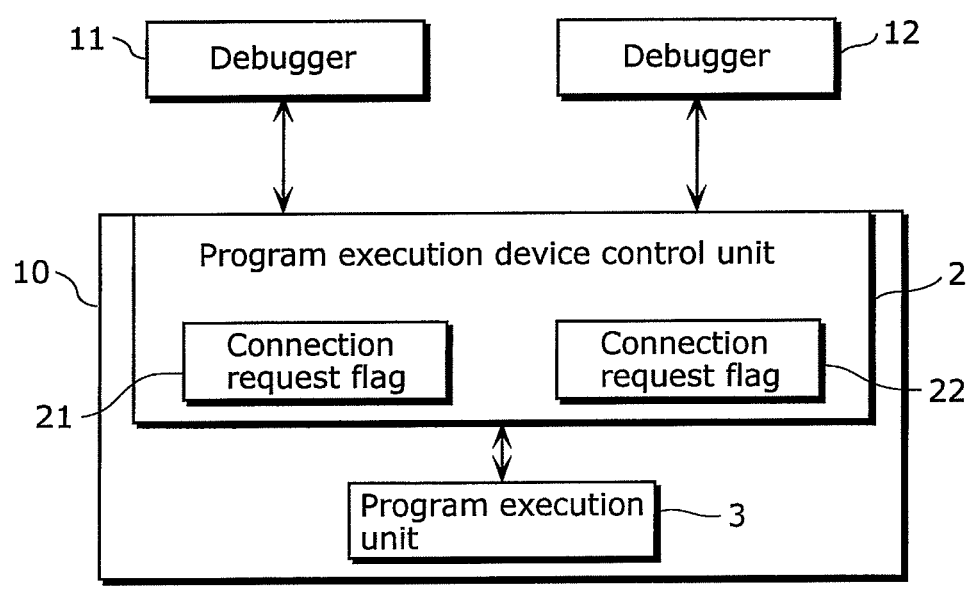
FIG. 6 is a block diagram showing a configuration of a simulator and debuggers connected to the simulator according to Embodiment 2.

FIG. 6 is a block diagram showing a configuration of the simulator 10 and the debuggers connected to the simulator 10 according to Embodiment 2.

The simulator 10 includes the program execution device control unit 2 and the program execution unit 3, and is connected to the debugger 11 and the debugger 12.

The program execution device control unit 2 includes: a connection request flag 21 for holding a connection request or a disconnection request from the debugger 11, and a connection request flag 22 for holding a connection request or a disconnection request from the debugger 12. Here, the disconnection request is, for example, a request for disconnecting the connection between the debugger 11 and the simulator 10. The connection request is, for example, a request for connecting, to the simulator 10, a debugger which has newly established a physical connection to the simulator 10.

For simplicity of explanation, a configuration in which two debuggers are connected is described in Embodiment 2 of the present invention; however, any number of debuggers may be connected as long as at least two debuggers are connected. In that case, the program execution device control unit 2 has as many connection request flags as the number of the debuggers connected to the simulator 10. Each connection request flag holds a connection request from a corresponding debugger. Accordingly, if two or more debuggers are connected to the simulator 10, the similar advantageous effects can be obtained by the method similar to the disclosure of the present invention.

The connection request flag 21 holds the connection request or the disconnection request from the debugger 11. Here, the connection request flag 21 has, for example, an initial value set to 0.

Further, the set value of the connection request flag 21 is changed by the program execution device control unit 2.

More specifically, the connection request flag 21 has a value set to 1 upon receipt of a connection request from the debugger 11, and a value set to 0 upon receipt of the disconnection request. This causes the connection request flag 21 to hold the connection request or the disconnection request from the debugger 11.

Description of the connection request flag 22 is not repeated since it is similar to that of the connection request flag 21.

Upon receipt of a connection request or disconnection request from the debugger 11 or the debugger 12 connected to the simulator 10, the program execution device control unit 2 determines whether or not it is necessary to terminate program execution. Here, the termination of program execution includes not only the program execution unit 3 terminating the program being executed, but also shutting down the simulator 10.

Further, the program execution device control unit 2 instructs the program execution unit 3 to terminate program execution, according to the determination result of whether or not the termination of program execution is necessary.

Here, the program execution device control unit 2 determines the termination of the program execution, using the connection request flag 21 or the connection request flag 22.

To be more specific, the program execution device control unit 2 refers to the value set to the connection request flag 21 or the connection request flag 22 to determine the termination of the program execution. For example, the program execution device control unit 2 determines that the program execution can be terminated when the program execution device control unit 2 confirms that both of the connection request flag 21 and the connection request flag 22 have the values set to 0, and terminates the program execution.

On the other hand, for example, the program execution device control unit 2 can determine that the debugger 12 cannot terminate the program execution when the program execution device control unit 2 confirms that the connection request flag 21 has the value set to 0, and the connection request flag 22 has the value set to 1. Therefore, the program execution device control unit 2 does not terminate the program execution till the connection request flag 22 has the value set to 0.

Next, a program execution termination determination step S4 according to Embodiment 2 of the present invention is described.

Figure 7:
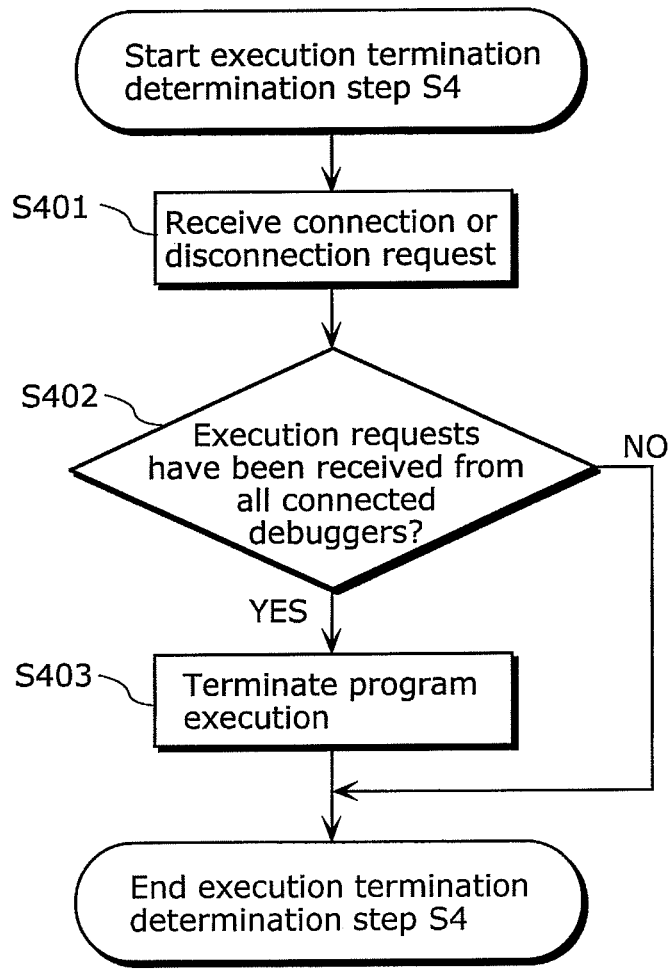
FIG. 7 is a flowchart showing processing of a program execution termination determination step S4 according to Embodiment 2.

FIG. 7 is a flowchart showing processing of the program execution termination determination step S4 according to Embodiment 2.

The program execution device control unit 2 in the simulator 10 starts the program execution termination determination step S4 upon receipt of the connection request or the disconnection request from the debugger 11 or the debugger 12.

First, the program execution device control unit 2 stores the receipt of the connection request or the disconnection request from the debugger 11 or the debugger 12 connected to the simulator 10 (S401: connection request or disconnection request receiving step).

Here, the program execution device control unit 2 uses the connection request flag 21 or the connection request flag 22 so as to indicate which of the debugger 11 or the debugger 12 has made the connection request or the disconnection request.

For example, the program execution device control unit 2 sets the value of the connection request flag 21 to 1 upon receipt of the connection request from the debugger 11, and sets the value of the connection request flag 22 to 1 upon receipt of the connection request from the debugger 12. On the other hand, the program execution device control unit 2 sets the value of the connection request flag 21 to 0 upon receipt of the disconnection request from the debugger 11, and sets the value of the connection request flag 22 to 0 upon receipt of the disconnection request from the debugger 12. It is assumed that the initial values of the connection request flag 21 and the connection request flag 22 are set to 0.

Next, the program execution device control unit 2 determines whether or not the disconnection requests have been received from all the debuggers (the debugger 11 and the debugger 12) (S402: Disconnection request receipt determination step).

To be more specific, the program execution device control unit 2 confirms whether or not both of the connection request flag 21 and the connection request flag 22 have the values set to 0.

When the program execution device control unit 2 determines in S402 that the disconnection requests have been received from all the debuggers (the debugger 11 and the debugger 12), the program execution device control unit 2 instructs the program execution unit 3 to terminate program execution (S403: program execution termination step).

More specifically, when the program execution device control unit 2 confirms that both of the connection request flag 21 and the connection request flag 22 have the values set to 0, the program execution device control unit 2 instructs the program execution unit 3 to terminate program execution.

Then, the program execution termination determination step S4 ends.

When the program execution device control unit 2 determines in S402 that a connection request has been received from any one of the debuggers (debugger 11 or debugger 12), the program execution device control unit 2 ends the program execution termination determination step S4 without any instructions to the program execution unit 3.

In such a manner, the program execution device control unit 2 performs the program execution termination determination step S4.

As described, according to Embodiment 2, the simulator receives the connection requests or disconnection requests individually from the connected debugger 11 and debugger 12, determines whether or not the disconnection requests have been received from all the debuggers (debugger 11 and the debugger 12) connected to the simulator 10. Then, the simulator 10 terminates the program execution when determined that the disconnection requests have been received from all the debuggers (the debugger 11 and the debugger 12).

In such a manner, with the program execution device and the method for controlling the same according to Embodiment 2, program execution is automatically terminated when the simulator 10 (the program execution device 1) determines that program debugging has been terminated. As a result, it is possible to reduce man-hour that the developer manually terminates program execution.

As described, according to Embodiment 2, it is possible to terminate program execution of the simulator 10 based on the combination of the requests indicated by the flags, without providing the communication interface for the debuggers and interactions between the debuggers.

(Embodiment 3)

Figure 8:
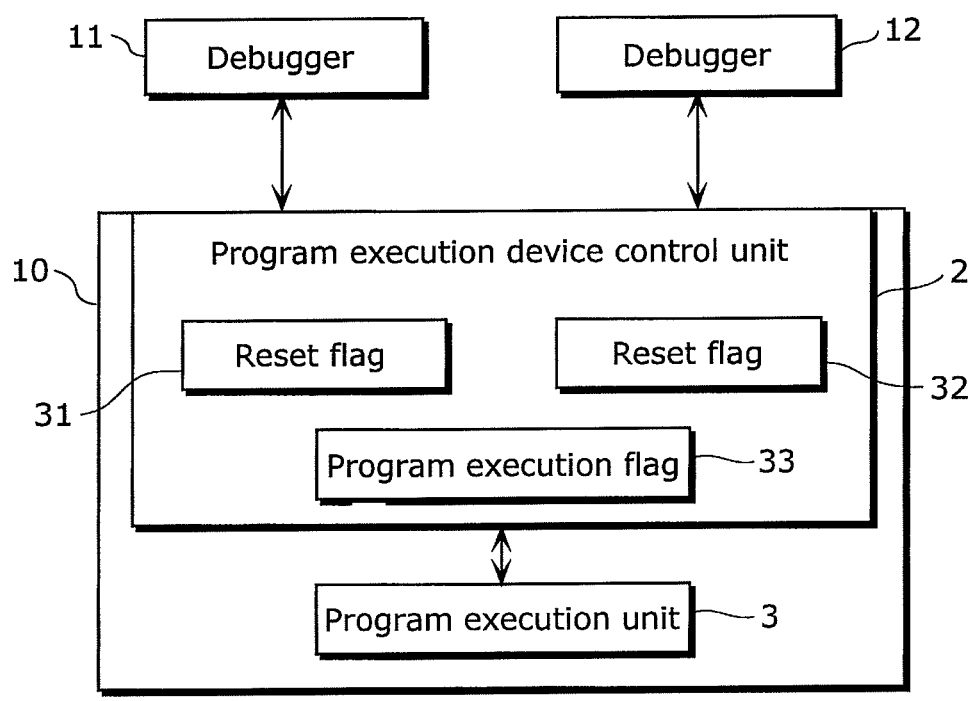
FIG. 8 is a block diagram showing a configuration of a simulator and debuggers connected to the simulator according to Embodiment 3.

FIG. 8 is a block diagram showing a configuration of the simulator 10 and debuggers connected to the simulator 10 according to Embodiment 3.

The simulator 10 includes the program execution device control unit 2 and the program execution unit 3, and is connected to the debugger 11 and the debugger 12.

The program execution device control unit 2 includes: a program execution flag 33 for storing whether or not the program execution unit 3 has performed program execution; a reset flag 31 for holding information indicating validity of a reset request from the debugger 11; and a reset flag 32 for holding information indicating validity of a reset request from the debugger 12.

For simplicity of explanation, a configuration in which two debuggers are connected is described in Embodiment 3 of the present invention; however, any number of debuggers may be connected as long as at least two debuggers are connected. In that case, the program execution device control unit 2 has as many reset flags as the number of debuggers connected to the simulator 10. Each reset flag corresponds to the reset request from the corresponding debugger. Accordingly, if two or more debuggers are connected to the simulator 10, the similar advantageous effects can be obtained by the method similar to the disclosure of the present invention.

The reset flag 31 holds information indicating validity of the reset request from the debugger 11. Here, the reset flag has an initial value set to 0. The set value is changed by the program execution device control unit 2.

For example, the reset flag 31 has a value set to 1 upon receipt of a valid reset request from the debugger 11, and has a value set to 0 upon receipt of an invalid reset request. This causes the reset flag 31 to hold information indicating whether the reset request from the debugger 11 is valid or invalid.

The program execution flag 33 holds information indicating whether or not the program execution unit 3 has performed program execution. Here, the program execution flag 33 has an initial value set to 0. The set value is changed by the program execution device control unit 2. Further, whether or not program execution has been performed includes not only the case where the program is being executed, but also the case where the program has been executed and terminated.

For example, the value of the program execution flag 33 is set to 1 when the program execution unit 3 has performed program execution.

Description of the reset flag 32 is not repeated as it is similar to that of the reset flag 31.

When newly (or again) connecting a debugger to the simulator 10, the program execution device control unit 2 determines whether reset processing is necessary or not upon receipt of a reset request from the debugger. Here, the reset processing refers to processing for reverting the program execution device 1 (here, the simulator 10) to its initial state.

Further, the program execution device control unit 2 performs reset processing according to the determination result of whether the reset processing is necessary or not.

Here, the program execution device control unit 2 determines the reset processing, using the program execution flag 33, the reset flag 31 and the reset flag 32.

To be more specific, the program execution device control unit 2 determines the reset processing by referring to the values of the program execution flag 33 and the reset flag 31 corresponding to, for example, the debugger 11 which has made the reset request.

Then, for example, the program execution device control unit 2 continues program execution without reset processing when confirmed that the program execution flag 33 has the value set to 1 and the reset flag 31 has the value set to 0. On the other hand, when confirmed that the reset flag 31 has the value set to 1, the program execution device control unit 2 performs reset processing and continues program execution.

The processing similar to the reset flag 31 is performed on the reset flag 32.

Next, the reset processing determination step S5 according to Embodiment 3 is described.

Figure 9:
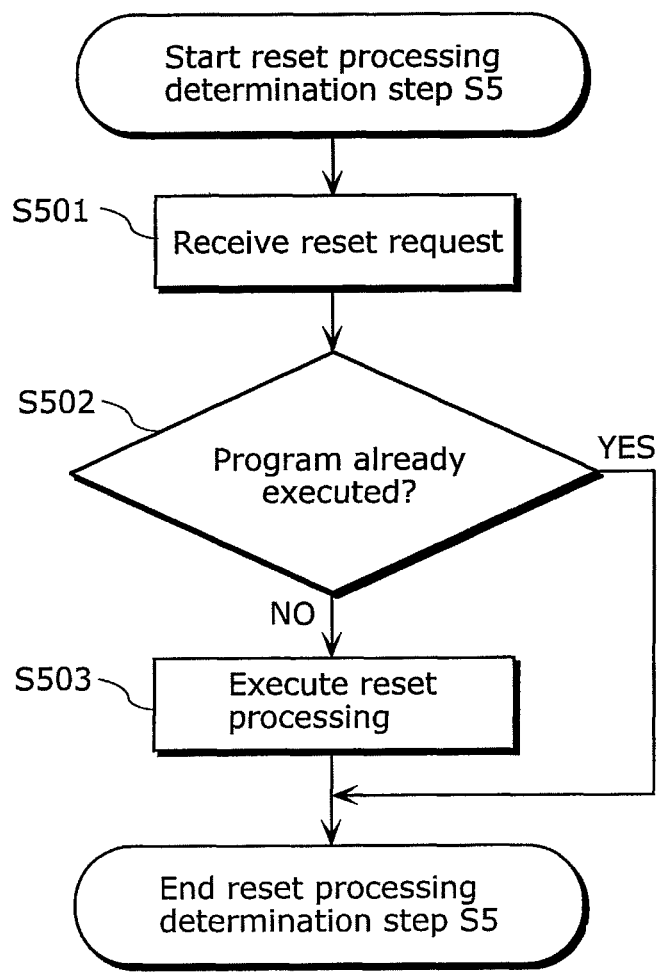
FIG. 9 is a flowchart showing processing of a reset processing determination step S5 according to Embodiment 3.

FIG. 9 is a flowchart showing the processing of the reset processing determination step S5 according to Embodiment 3 of the present invention.

The program execution device control unit 2 in the simulator 10 starts the reset processing determination step S5 upon receipt of the reset request from the debugger 11 or the debugger 12.

First, the program execution device control unit 2 stores the receipt of the reset request from the debugger 11 or the debugger 12 connected to the simulator 10 (S501: reset request receiving step).

Next, the program execution device control unit 2 determines whether or not program execution has been performed using the program execution flag 33 (S502: program execution determination step).

More specifically, the program execution device control unit 2 confirms whether or not the program execution flag 33 has the value set to 1.

The program execution device control unit 2 ends the reset processing determination step S5 without instructing anything when determined in the program execution determination step S502 that program execution has already been performed.

More specifically, the program execution device control unit 2 ends the reset processing determination step S5 without instructing anything when confirmed that the program execution flag 33 has the value set to 1.

On the other hand, the program execution device control unit 2 instructs the program execution unit 3 to perform the reset processing when determined in the program execution determination step S502 that program execution has not been performed (S503: reset processing execution step).

Then, the reset processing determination step S5 ends.

The program execution device control unit 2 determines in the program execution determination step S502 whether the reset request received from the debugger 11 is valid or not, and sets the value of the reset flag 31 to 1 when the reset request is valid, and the processing continues at the reset processing determination step S5. On the other hand, when the reset request is invalid, the value of the reset flag 31 is set to 0, and the reset processing determination step S5 ends.

In such a manner, the program execution device control unit 2 performs the reset processing determination step S5.

Accordingly, even when a debugger is newly connected while the program is being executed, it is possible to continue debugging without influencing programs being executed.

(Variation 1)

Next, the reset processing determination step S6 according to Embodiment 3 of the present invention is described.

Figure 10:
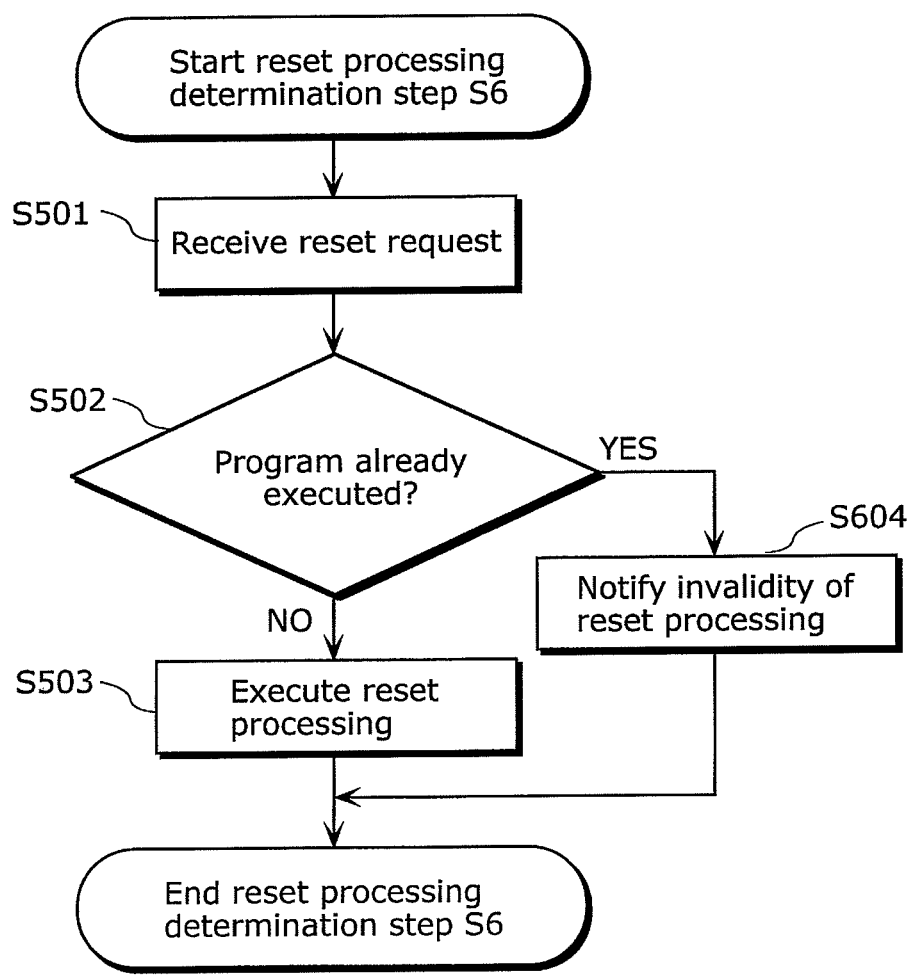
FIG. 10 is a flowchart showing processing of a reset processing determination step S6 according to Embodiment 3.

FIG. 10 is a flowchart showing the processing of the reset processing determination step S6 according to Embodiment 3 of the present invention.

The reset processing determination step S6 includes the reset processing determination step S5 described above and the reset processing invalidity notification step S604. Like numerals are used to indicate like elements in FIG. 9, and the descriptions of them are not repeated.

The program execution device control unit 2 notifies the debugger (for example, the debugger 11) which has made the reset request that the reset processing was invalid when determined in the program execution determination step S502 that program execution has already been performed (S604: invalidity notification step)

Then, the reset processing determination step S6 ends.

In such a manner, the program execution device control unit 2 performs the reset processing determination step S6.

Accordingly, by notifying to the debugger that the reset processing was invalid, the developer can recognize that the reset processing was invalid, and understand the operations of the simulator 10 (the program execution device 1).

(Variation 2)

Next, the reset processing determination step S7 according to Embodiment 3 of the present invention is described.

Figure 11:
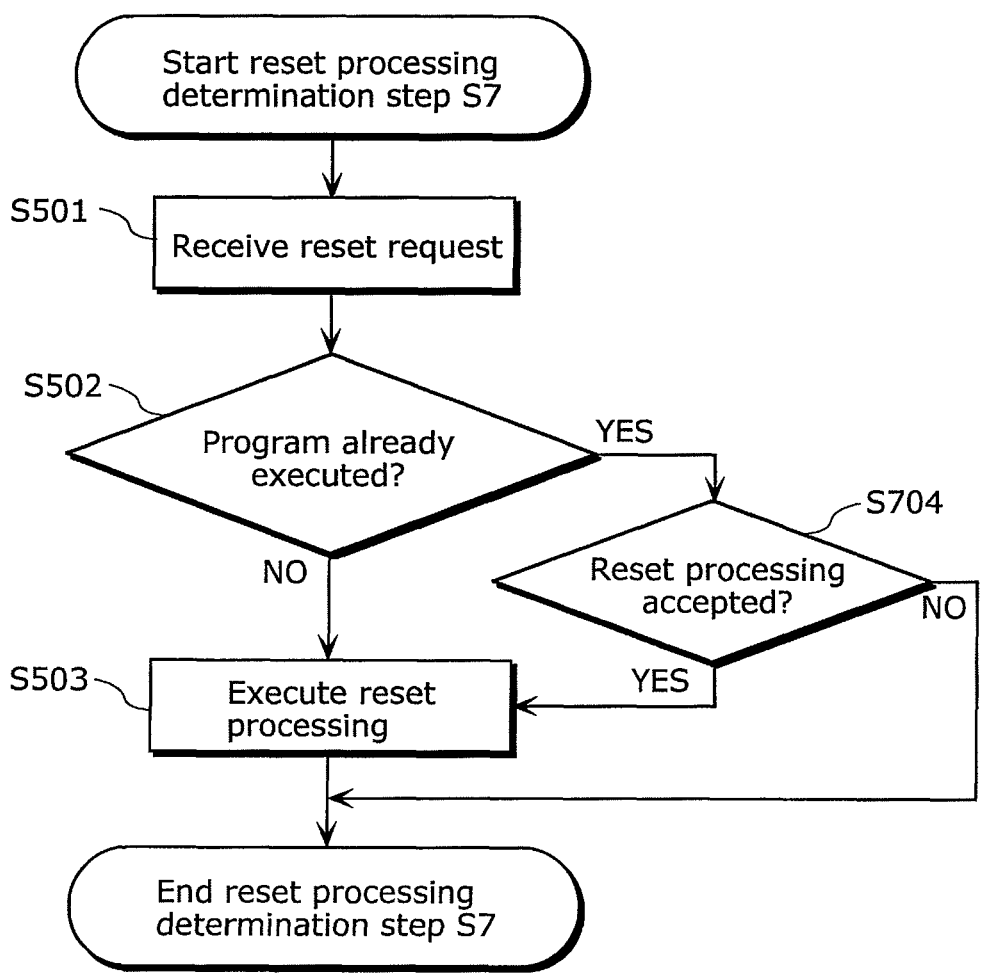
FIG. 11 is a flowchart showing processing of a reset processing determination step S7 according to Embodiment 3.

FIG. 11 is a flowchart showing the processing of the reset processing determination step S7 according to Embodiment 3 of the present invention.

The reset processing determination step S7 includes the reset processing determination step S5 and the reset processing receipt determination step S704. Like numerals are used to indicate like elements in FIG. 9, and the descriptions of them are not repeated.

The program execution device control unit 2 determines whether to accept the reset processing when determined in the program execution determination step S502 that program execution has already been performed.

To be more specific, the program execution device control unit 2 performs the reset processing execution step S503 when confirmed that the reset flag 31 has the value set to 1. After performing the reset processing execution step S503, the reset processing determination step S7 ends.

On the other hand, the program execution device control unit 2 ends the reset processing determination step S7 without instructing anything when confirmed that the reset flag 31 has the value set to 0.

Description of the reset flag 32 is not repeated as it is similar to that of the reset flag 31.

In such a manner, the program execution device control unit 2 performs the reset processing determination step S7.

Accordingly, the program execution device control unit 2 can forcibly perform the reset processing at developer's desired timing regardless of the state of the program execution flag 33, upon receipt of the reset request from the debugger 11 or the debugger 12 newly connected.

(Variation 3)

Next, the reset processing determination step S8 according to embodiments of the present invention is described.

Figure 12:
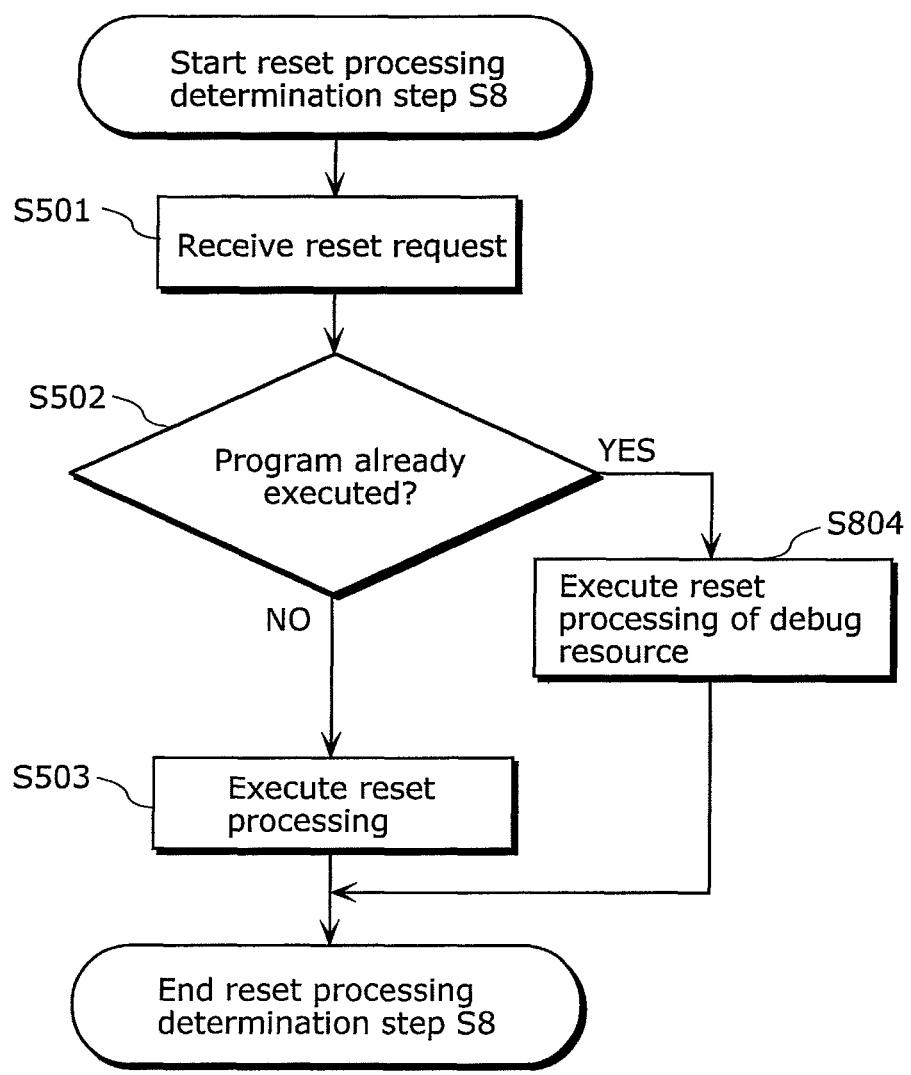
FIG. 12 is a flowchart showing processing of a reset processing determination step S8 according to Embodiment 3.

FIG. 12 is a flowchart showing the processing of the reset processing determination step S8 according to Embodiment 3 of the present invention.

The reset processing determination step S8 includes the reset processing determination step S5 and the debug resource reset processing execution step S804. Like numerals are used to indicate like elements in FIG. 9, and the descriptions of them are not repeated.

The program execution device control unit 2 performs the reset processing of the debug resource when determined in the program execution determination step S502 that program execution has already been performed.

More specifically, the program execution device control unit 2 performs the debug resource reset processing execution step S804 when confirmed that the program execution flag 33 has the value set to 1. After performing the debug resource reset processing execution step S804, the reset processing determination step S8 ends.

In such a manner, the program execution device control unit 2 performs the reset processing determination step S7.

Accordingly, by initializing only the debug resource of the connected debugger while the program execution device control unit 2 is performing program execution, it is possible to prevent incorrect processing of the debug resource.

As described, according to Embodiment 2, it is possible to perform reset processing or initialization of the debug resource based on the combination of the requests indicated by the flags, without providing the communication interface for the debuggers and any interactions between the debuggers.

As described, according to the embodiments of the present invention, it is possible to achieve the program execution device and the method for controlling the same which can control the program execution device based on the combination of the requests indicated by the flags, without providing the communication interface for the debuggers and any interactions between the debuggers.

Figure 13:
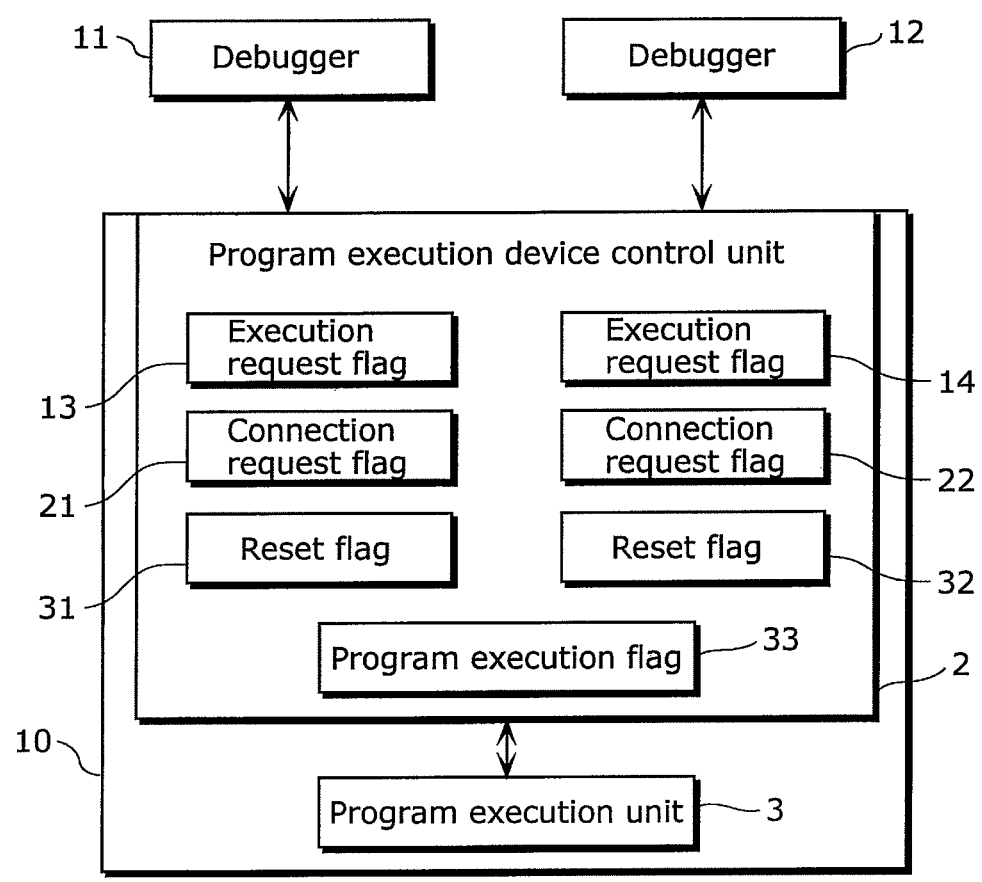
FIG. 13 is a block diagram showing a configuration of a simulator and debuggers connected to the simulator according to embodiments of the present invention.
Figure 14:
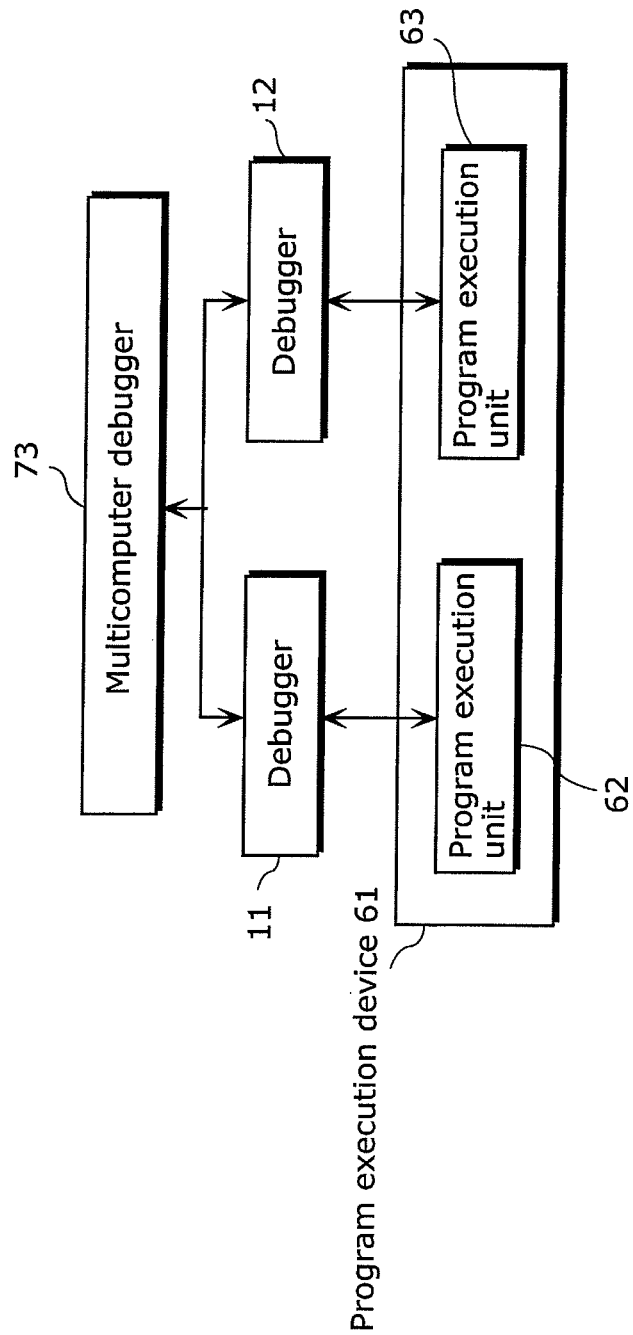
FIG. 14 is a block diagram showing a configuration of a multicomputer debugger system.

In Embodiment 1 or 3, it has been described that the program execution device is controlled based on the combination of the requests indicated by the flags without providing the communication interface for the debuggers and without any interactions between the debuggers; however, the present invention is not limited to this. In other words, as shown in FIG. 13, a combination of embodiments is also included in the scope of the present invention. FIG. 13 is a block diagram showing a configuration of a simulator and debuggers connected to the simulator according to the combination of the embodiments of the present invention.

Embodiments of the program execution device and the method for controlling the same according to the present invention have been described; however, the present invention is not limited to those embodiments. Those skilled in the art will readily appreciate that many modifications in the exemplary embodiments and combinations of elements in different embodiments are possible without materially departing from the novel teachings and advantages of this invention. Accordingly, all such modifications are intended to be included within the scope of this invention.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

Industrial Applicability

The present invention can be used for the program execution device and the method for controlling the same. In particular, the present invention can be used for the program execution device which includes a simulator which simulates multiple processors or an evaluation board on which multiple processors are mounted, and the method for controlling the same, or for the program execution device which can control a simulator of the system LSI by multiple debuggers and the method for controlling the same.

What is claimed is:

1. A method for controlling a program execution device which includes a plurality of debuggers and a program execution unit, the program execution unit executing, in parallel, a plurality of programs to be debugged by the debuggers, said method comprising:
receiving a start request to start program execution or a stop request to stop program execution from each of the debuggers, and holding flags, a value of each of the flags indicating the start request or the stop request for one of the debuggers;
causing the program execution unit to start or stop executing the programs, based on a combination of requests indicated by the flags, each of the requests being the start request or the stop request,
wherein, in said causing, when the program execution unit is caused to stop executing the programs, the stopping of the execution of the programs is notified to a debugger included in the debuggers and corresponding to a flag indicating the stop request,
upon receipt of the start request or the stop request from one or more of the debuggers, values of the flags for the debuggers are referred to and it is determined whether or not it is necessary to start or stop the program execution based on the values of the flag, and
if one value of the flags indicates a stop request, the program execution unit stops executing all of the programs, and wherein only if all values of the flags indicate start requests, the program execution unit starts executing all of the programs.

2. The method for controlling a program execution device according to claim 1, wherein, in said causing, when each of the requests of the combination is only the start request, the program execution unit starts executing all of the programs.

3. The method for controlling a program execution device according to claim 2, wherein, in said causing, when the combination includes the stop request, the program execution unit stops executing all of the programs, and notifies the stopping of the execution of the programs only to the debugger corresponding to the stop request.

4. The method for controlling a program execution device according to claim 3, wherein, in said holding, when a breakpoint is detected in any one of the programs being executed by the program execution unit, a flag indicating the stop request from a debugger is held assuming that the stop request to stop the execution of the any one of the programs has been received, the debugger being included in the debuggers and corresponding to the any one of the programs in which the breakpoint has been detected.

5. A program execution device comprising:
a program execution unit configured to execute, in parallel, a plurality of programs to be debugged by a plurality of debuggers;
a holding unit configured to receive a start request to start program execution or a stop request to stop program execution from each of the debuggers, and to hold flags, a value of each of the flags indicating the start request or the stop request for one of the debuggers; and
a program execution control unit configured to cause said program execution unit to start or stop executing the programs, based on a combination of requests indicated by the flags, each of the requests being the start request or the stop request,
wherein when the program execution unit is caused to stop executing the programs, said program execution control unit is configured to notify a debugger of the stopping of the execution of the programs, the debugger being included in the debuggers and corresponding to a flag indicating the stop request,
a program execution control unit is further configured to, upon receipt of the start request or the stop request from one or more of the debuggers, refer to values of the flags for the debuggers and determine whether or not it is necessary to start or stop the program execution based on the values of the flags, and
if one value of the flags indicates a stop request, the program execution unit stops executing all of the programs, and wherein only if all values of the flags indicate start requests, the program execution unit starts executing all of the programs.

* * * * *